(12) United States Patent
Herko et al.

(10) Patent No.: US 7,850,804 B2
(45) Date of Patent: Dec. 14, 2010

(54) MEMBER FOR SMOOTHING FLEXIBLE BELT SEAMS AND METHOD FOR USING

(75) Inventors: Jonathan H. Herko, Walworth, NY (US); Michael S. Roetker, Webster, NY (US); David W. Martin, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 296 days.

(21) Appl. No.: 12/128,054

(22) Filed: May 28, 2008

(65) Prior Publication Data

US 2009/0294512 A1    Dec. 3, 2009

(51) Int. Cl.
*B32B 37/00* (2006.01)
(52) U.S. Cl. ............ 156/73.4; 156/73.1; 156/157; 156/580.2
(58) Field of Classification Search .......... 156/73.1, 156/73.4, 137, 157, 304.1, 555, 580.1, 580.2, 156/581, 582
See application file for complete search history.

(56) References Cited

U.S. PATENT DOCUMENTS

| 4,532,166 | A | * | 7/1985 | Thomsen et al. |
| 4,786,570 | A | * | 11/1988 | Yu et al. |
| 4,937,117 | A | * | 6/1990 | Yu |
| 5,021,309 | A | * | 6/1991 | Yu |
| RE38,248 | E | * | 9/2003 | Yu et al. ................ 156/64 |
| 7,491,281 | B2 | * | 2/2009 | Darcy et al. ............ 156/73.3 |

\* cited by examiner

*Primary Examiner*—James Sells
(74) *Attorney, Agent, or Firm*—Pillsbury Winthrop Shaw Pittman LLP

(57) ABSTRACT

An improved member for use in welding seamed flexible belts to produce smoother seams having reduced seam thickness. The improved member has a unique configuration, that includes a ridge defined at an end of the member and further includes a V-shape groove or cut defined in the ridge, which helps facilitate welding of the seam overlap region.

12 Claims, 4 Drawing Sheets

MEMBER FOR SMOOTHING FLEXIBLE BELT SEAMS AND METHOD FOR USING

BACKGROUND

The present embodiments relate generally to an improved member that is used to smooth flexible imaging member belts to produce a smooth seam with reduced thickness, and methods for using the same to produce seamed flexible belts. More specifically, embodiments relate to an ultrasonic horn with a unique configuration that allows efficient smoothing of the belt seam during transverse welding applications.

Electrophotographic printing is a well-known and commonly used method of copying or printing documents. Electrophotographic printing is performed by exposing a light image representation of a desired document onto a substantially uniformly charged photoreceptor. In response to that light image the photoreceptor discharges, creating an electrostatic latent image of the desired document on the photoreceptor's surface. Toner is then deposited onto that latent image, forming a toner image. The toner image is then transferred from the photoreceptor onto a receiving substrate such as a sheet of paper. The transferred toner image is then fused with the substrate, usually using heat and/or pressure. The surface of the photoreceptor is then cleaned of residual developing material and recharged in preparation for the production of another image.

The foregoing generally describes black and white electrophotographic printing machines. Electrophotographic printing can also produce color images by repeating the above process for each color of toner that is used to make the color image. For example, the photoreceptive surface may be exposed to a light image that represents a first color, say black. The resultant electrostatic latent image can then be developed with black toner particles to produce a black toner layer that is subsequently transferred onto a receiving substrate. The process can then be repeated or a second color, say yellow, then for a third color, say magenta, and finally for a fourth color, say cyan. When the toner layers are placed in superimposed registration the desired composite color toner image is formed and fused on the receiving substrate.

The color printing process described above superimposes the color toner layers directly onto a substrate. Other electrophotographic printing systems use intermediate transfer belts. In such systems successive toner layers are electrostatically transferred in superimposed registration from the photoreceptor onto an intermediate transfer belt. Only after the composite toner image is formed on the intermediate transfer belt is that image transferred and fused onto the substrate. Indeed, some electrophotographic printing systems use multiple intermediate transfer belts, transferring toner to and from belts as required to fulfill the requirements of the machine's overall architecture.

In operation, an intermediate transfer belt is brought into contact with a toner image-bearing member such as a photoreceptor belt. In the contact zone an electrostatic field generating device such as a corotron, a bias transfer roller, a bias blade, or the like creates electrostatic fields that transfer toner onto the intermediate transfer belt. Subsequently, the intermediate transfer belt is brought into contact with a receiver. A similar electrostatic field generating device then transfers toner from the intermediate transfer belt to the receiver. Depending on the system, a receiver can be another intermediate transfer member or a substrate onto which the toner will eventually be fixed. In either case the control of the electrostatic fields in and near the transfer zone is a significant factor in toner transfer.

Intermediate transfer belts often take the form of seamed belts fabricated by fastening two ends of a web material together, such as by welding, sewing, wiring, stapling, or gluing. While seamless intermediate transfer belts are possible, they require manufacturing processes that make them much more expensive than similar seamed intermediate transfer belts. This is particularly true when the intermediate transfer belt is long.

Seamed belts are fabricated from a sheet cut from an imaging member web. The sheets are generally rectangular or in the shape of a parallelogram where the seam does not form a right angle to the parallel sides of the sheet. All edges may be of the same length or one pair of parallel edges may be longer than the other pair of parallel edges. The sheets are formed into a belt by joining overlapping opposite marginal end regions of the sheet. A seam is typically produced in the overlapping marginal end regions at the point of joining. Joining may be effected by any suitable means. Typical joining techniques include welding (including ultrasonic), gluing, taping, pressure heat fusing, and the like. For example, puzzle-cut seams are disclosed in 1 U.S. Pat. Nos. 5,487,707, 6,318,223, and 6,440,515, which are hereby incorporated by reference in their entirety. A typical ultrasonic welding process is carried out by holding down the overlapped ends of a flexible imaging member sheet with vacuum against a flat anvil surface and guiding the flat end of an ultrasonic vibrating horn transversely across the width of the sheet, over and along the length of the overlapped ends, to form a welded seam.

Belts, sheets, films and the like are important to the xerographic process. Belt function is often significantly affected by the seam of the belt. For example, belts formed according to known butting or overlapping techniques provide a bump or other discontinuity in the belt surface leading to a height differential between adjacent portions of the belt, for example, of 0.010 inches or more depending on the belt thickness. This increased height differential leads to performance failure in many applications.

When ultrasonically welded into a belt, the seam of multi-layered electrophotographic imaging flexible member belts may occasionally contain undesirable high protrusions such as peaks, ridges, spikes, and mounds. These seam protrusions present problems during image cycling of the belt machine because they interact with cleaning blades to cause blade wear and tear, which ultimately affect cleaning blade efficiency and service life.

A bump, surface irregularity, or other discontinuity in the seam of the belt may disturb the tuck of the cleaning blade as it makes intimate contact with the photoconductive member surface to effect residual toner and debris removal. The increased height differential may allow toner to pass under the cleaning blade and not be cleaned. Furthermore, seams having differential heights may, when subjected to repeated striking by cleaning blades, cause photoconductive member cycling speed disturbance which affects the crucial photoconductive belt motion quality. Moreover, seams with a bump or any morphological defects can cause the untransferred, residual toner to be trapped in the sites of seam surface irregularities. The seam of a photoreceptor belt which is repeatedly subjected to the striking action by a cleaning blade under machine functioning conditions has triggered the development of pre-mature seam delamination failure. In addition, the discontinuity in belt thickness due to the presence of an excessive seam height yields variances of mechanical strength in the belt as well as reducing the fatigue flex life of the seam when cycling over the belt module support rollers.

As a result, both the cleaning life of the blade and the overall service life of the photoreceptor belt can be greatly diminished.

Moreover, the protrusion high spots in the seam may also interfere with the operation of subsystems of copiers, printers and duplicators by damaging electrode wires used in development subsystems that position the wires parallel to and closely spaced from the outer imaging surface of belt photoreceptors. These closely spaced wires are employed to facilitate the formation of a toner powder cloud at a development zone adjacent to a toner donor roll and the imaging surface of the belt imaging member.

In addition, the copy quality of image printout can be degraded. Such irregularities in seam height provide vibrational noise in xerographic development which disturb the toner image on the belt and degrade resolution and transfer of the toner image to the final copy sheet. This is particularly prevalent in those applications requiring the application of multiple color layers of liquid or dry developer on a photoreceptor belt, which are subsequently transferred to a final copy sheet. Further, the seam discontinuity or bump in such a belt may result in inaccurate image registration during development, inaccurate belt tracking and overall deterioration of motion quality, as a result of the translating vibrations.

As such, there is a need for seamed belts with improved seam surface topology to withstand greater dynamic fatigue conditions and tools and methods for achieving these seams. For example, an improved belt having a seam which provides a smoother surface with substantially decreased or eliminated profile protrusions or irregularity would extend service life.

SUMMARY

According to embodiments illustrated herein, there is provided an improved member for ultrasonically welding the seams of flexible belts to produce welded seams that have an improved surface topology and reduced thickness of its welded seam overlap, and methods for using the improved member for making such welded seams.

In particular, an embodiment provides an improved member for ultrasonically welding seamed flexible imaging member belts comprising a ridge defined at an end of the member, and a tapered groove being defined in the ridge, wherein the tapered groove has a mouth and a tail, and further wherein the improved member is adapted to pull seam edges together during welding with the tapered groove. The tapered groove is cut into or formed in along the ridge.

Embodiments also provide an ultrasonic horn for welding seamed flexible imaging member belts comprising a ridge defined at an end of the ultrasonic horn, and a tapered groove being defined in the ridge, wherein the tapered groove is v-shaped and has a mouth and a tail, and further wherein the ultrasonic horn is adapted to pull seam edges together during welding with the tapered groove.

Further embodiments provide a method for making an ultrasonically welded seamed flexible imaging member belt comprising providing sheets of electrophotographic imaging material to be joined at opposite edges of the sheets, overlapping the sheets at the opposite edges, positioning over the overlapping region an improved member for ultrasonically welding seamed flexible imaging member belts comprising a ridge defined at an end of the member, and a tapered groove being defined in the ridge, wherein the tapered groove has a mouth and a tail, rotating the improved member such that the electrophotographic imaging material contacts the end of the member at the mouth of the tapered groove and exits the tail of the tapered groove or from either side of the tapered groove; and contacting the overlapping region with the improved member to focus heat and pressure along the overlapping region while pulling the opposite edges together such that a flexible belt having a smooth welded seam is produced.

BRIEF DESCRIPTION OF THE DRAWINGS

For a better understanding of the present embodiments, reference may be had to the accompanying figures.

DETAILED DESCRIPTION

In the following description, it is understood that other embodiments may be utilized and structural and operational changes may be made without departure from the scope of the present embodiments disclosed herein.

The present embodiments relate to an improved member for use in smoothing flexible belt seams to achieve ultrasonically welded seams having smoother surface topology and reduced seam thickness to greatly improve both the cleaning life of the cleaning blade and the overall service life of the flexible belt. More specifically, embodiments relate to an ultrasonic horn with a particular configuration that can be used in transverse welding application to produce smoother and thinner belt seams with longer service life.

Typical electrostatographic flexible belt imaging members include, for example, photoreceptors for electrophotographic imaging systems, electroreceptors such as ionographic imaging members for electrographic imaging systems, and intermediate image transfer belts for transferring toner images in electrophotographic and electrographic imaging systems. Those achieved with the present embodiments can be used with fuser belts, pressure belts, intermediate transfer belts, transfuse belts, transport belts, developer belts, photoreceptor belts, and the like. The seamed belts are prepared using the unique shape of the horn to form smoother seams with reduced thicknesses.

Figure 1:
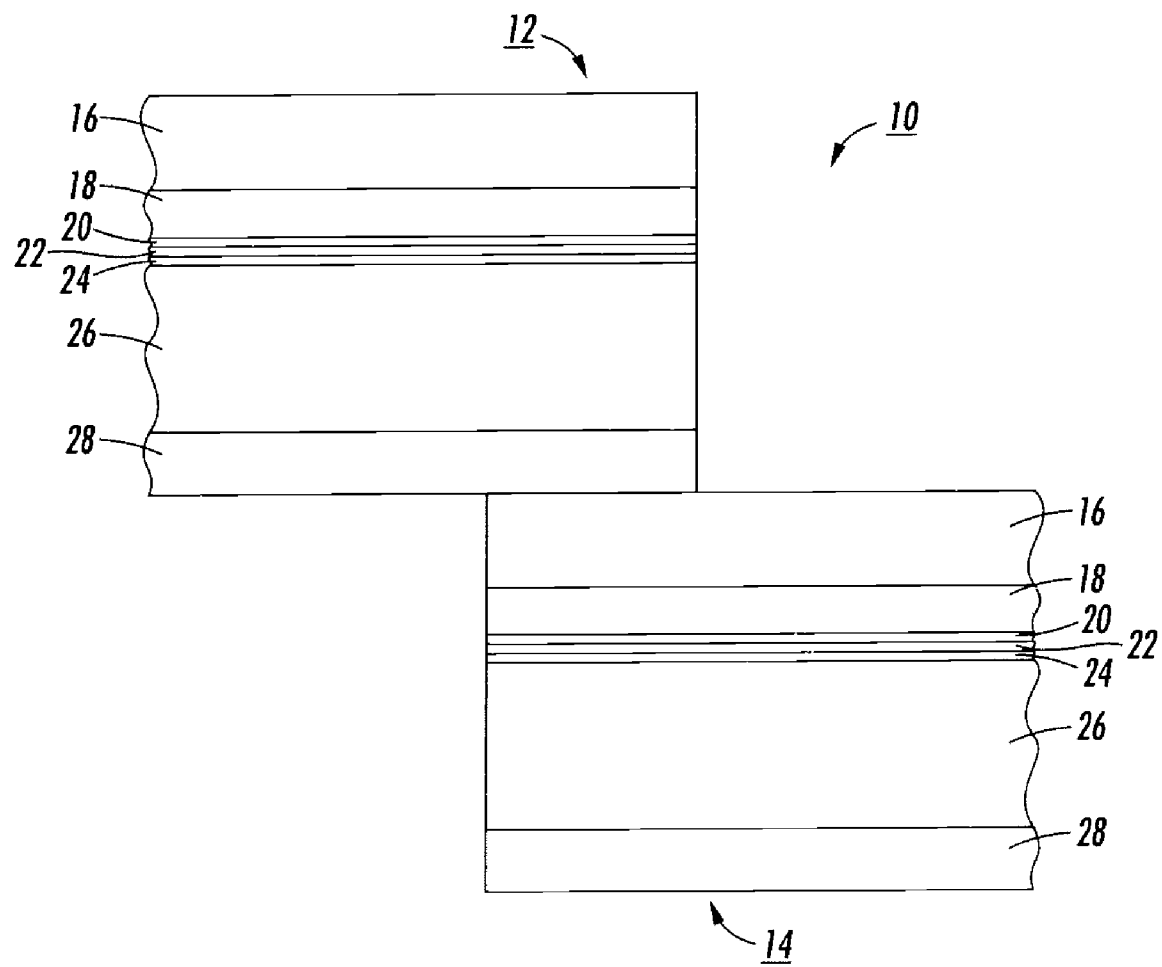
FIG. 1 is a cross-sectional view of a multilayered flexible sheet of imaging material with opposite ends overlapped.

Referring to FIG. 1, there is illustrated a flexible member 10 in the form of a sheet having a first end marginal region 12 overlapping a second end marginal region 14 to form an overlap region ready for a seam forming operation. The flexible member 10 can be utilized within an electrophotographic imaging device and may be a single film substrate member or a member having a film substrate layer combined with one or more additional coating layers. At least one of the coating layers comprises a film forming binder.

The flexible member 10 may be a single layer or comprise multiple layers. If the flexible member 10 is to be a negatively charged photoreceptor device, the flexible member 10 may comprise a charge generator layer sandwiched between a conductive surface and a charge transport layer. Alternatively, if the flexible member 10 is to be a positively charged photoreceptor device, the flexible member 10 may comprise a charge transport layer sandwiched between a conductive surface and a charge generator layer.

The layers of the flexible member 10 can comprise numerous suitable materials having suitable mechanical properties. Examples of typical layers are described in U.S. Pat. No.

4,786,570, U.S. Pat. No. 4,937,117 and U.S. Pat. No. 5,021, 309, the entire disclosures thereof being incorporated herein by reference. The flexible member 10 shown in FIG. 1, including each end marginal region 13 and 14, comprises from top to bottom a charge transport layer 16 (e.g., 24 micrometers thick), a generator layer 18 (e.g., 1 micrometer thick), an interface layer 20 (e.g., 0.05 micrometer thick), a blocking layer 22 (e.g., 0.04 micrometer thick), a conductive ground plane layer 24 (e.g., 0.02 micrometer thick, a supporting layer 26 (e.g., 76.2 micrometer thick), and an anti-curl back coating layer 28 (e.g., 14 micrometer thick). It should be understood that the thickness of the layers are for purposes of illustration only and that a wide range of thicknesses can be used for each of the layers.

Figure 2:
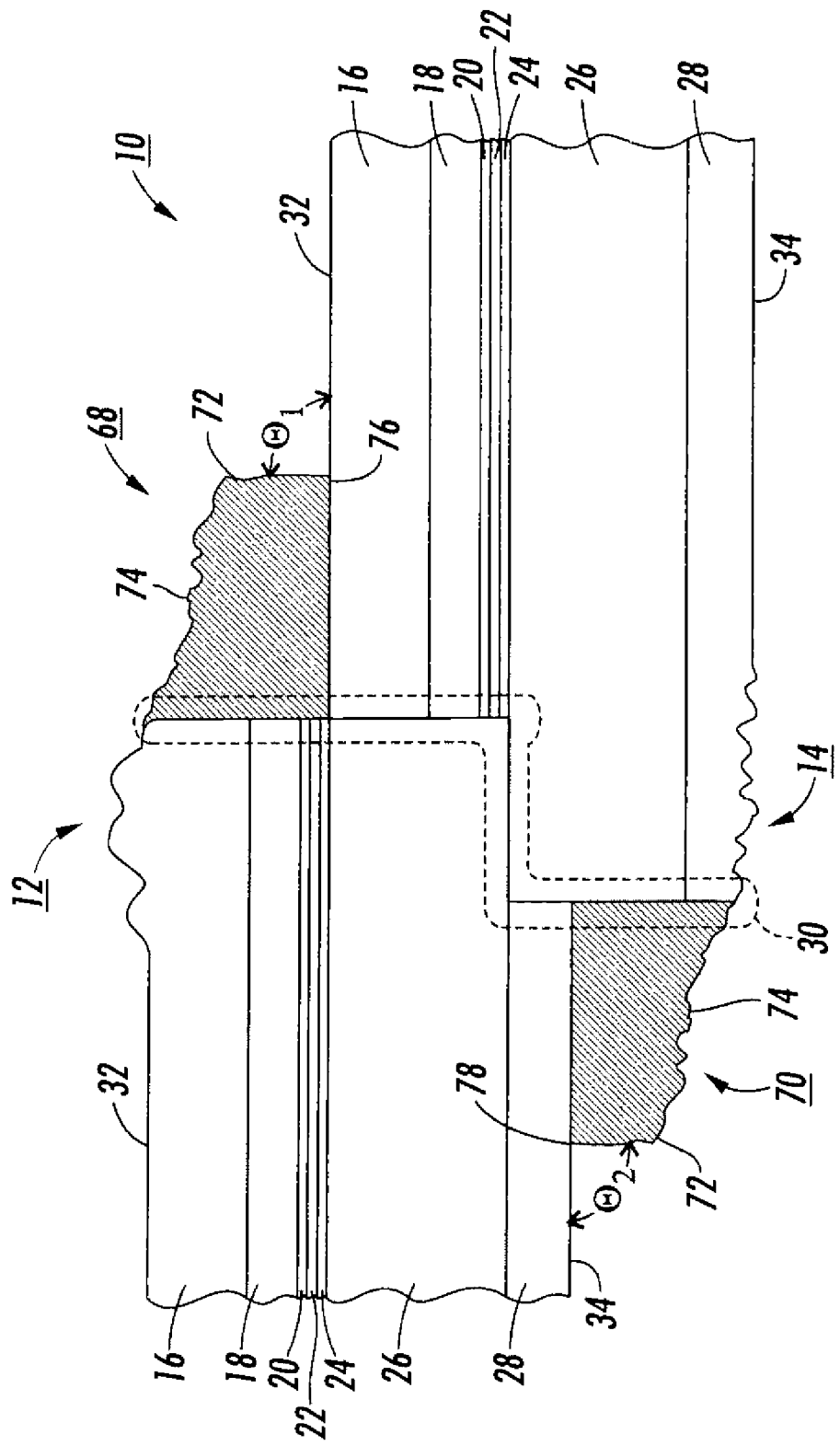
FIG. 2 is a cross-sectional view of a multilayered seamed belt derived from the sheet of FIG. 1 after ultrasonic seaming welding.

The end marginal regions 12 and 14 can be joined by any suitable means including gluing, taping, stapling, pressure and heat fusing to form a continuous member such as a belt, sleeve, or cylinder. Both heat and pressure can be used to bond the end marginal regions 12 and 14 into a seam 30 in the overlap region as illustrated in FIG. 2. The flexible member 10 is thus transformed from a sheet of electrophotographic imaging material as illustrated in FIG. 1 into a continuous electrophotographic imaging belt as illustrated in FIG. 2. The flexible member 10 has a first exterior major surface or side 32 and a second exterior major surface or side 34 on the opposite side. The seam 30 joins the flexible member 10 so that the bottom surface 34 (generally including at least one layer immediately above) at and/or near the first end marginal region 12 is integral with the top surface 32 (generally including at east one layer immediately below) at and/or near the second end marginal region 14.

A heat and pressure joining means includes ultrasonic welding to transform the sheet of photoconductive imaging material into a photoreceptor belt. The belt can be fabricated by ultrasonic welding of the overlapped opposite end regions of a sheet. In the ultrasonic seam welding process, ultrasonic energy applied to the overlap region is used to melt suitable layers such as the charge transport layer 16, generator layer 18, interface layer 20, blocking layer 22, part of the support layer 26 and/or anti-curl back coating layer 28. Direct fusing of the support layer achieves optimum seam strength.

Ultrasonic welding may be the method chosen for joining a flexible imaging member because it is rapid, clean and solvent-free and low cost, as well as because it produces a thin and narrow seam. In addition, ultrasonic welding may be used because the mechanical high frequency pounding of the welding horn causes generation of heat at the contiguous overlapping end marginal regions of the flexible imaging sheet loop to maximize melting of one or more layers therein to form a strong and precisely defined seam joint. The melting of the coating layers of the photoconductive sheet provides direct substrate to substrate contact of the opposite ends and fusing them into a seam. For example, ultrasonic welding and an apparatus for performing the same is disclosed in U.S. Pat. No. 4,532,166, which is hereby incorporated by reference.

Ultrasonic welding is a process that uses high frequency mechanical vibrations above the audible range. The vibrations are produced at the tip or end of a welding sonotrode or horn. The vibratory force emanating from such a horn device can be generated at high enough frequencies to soften or melt thermoplastic material components intended to be joined together. For example, such frequencies can be effective at 20, 30 or 40 kHz. One of the main advantages of ultrasonic welding may be found in the very short welding steps that enhance its usefulness even in mass production. Weld times may last less than a second.

Seam formation in belt products has been carried out using ultrasonic welding for many years. Application of the sonic energy to the photoreceptor edge is conducted through an ultrasonic horn and thus is a function of the horn design.

Various horn configurations have been used and the convention configurations have a ridged profile. The problem with these conventional members, however, is that they produce high profile (or thick) welds and encrusted deposits along the seam. In addition, the welded seams exhibit low seam strength. The present embodiments, employ a unique tip to the horn which have been used to produce much desired properties in the welded seams.

Figure 3:
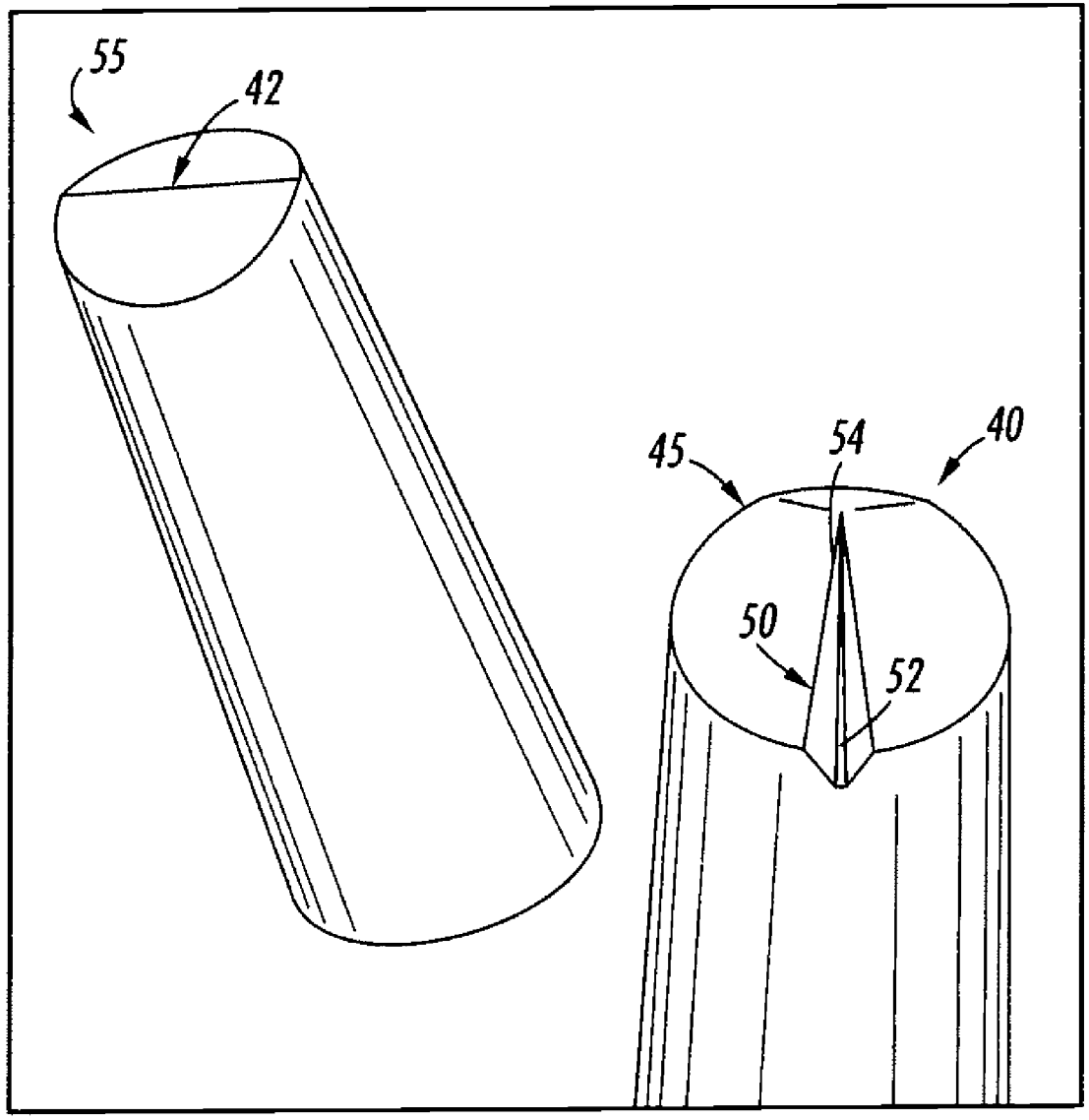
FIG. 3 is a side view of an improved horn for use in welding seamed belts in accordance with the present embodiments.

Referring to FIG. 3, there is illustrated an ultrasonic horn 40 in accordance with the present embodiments. The horn 40 is formed such that an end 45 of the horn 40 has a tapered cut or groove 50 formed along and defined by the ridge 42 defined at the end 45 of the horn 40. In embodiments, the tapered cut or groove 50 may resemble a "V-shape." The tapered cut or groove 50 has a mouth 52 and a tail 54 where the mouth 52 is wider than the tail 54. The portion of the tapered groove 50 into which the seam material enters is here for convenience called the mouth, and the portion of the tapered groove 50 from which the seam material exits is here for convenience called the tail.

It has been demonstrated that this V-shape cut 50 pulls the two photoreceptor edges together during welding, which allows for a significantly reduced overlap along the seam. This reduced overlap provides for reduced seam thickness. In contrast, a conventional horn 55 tends to push the two edges apart. The V-shape indentation 50 further serves to collect excess melt and then redeposit material into seam gaps. Resulting seams welded with the horn 40 are generally half the step height found in those made with the conventional members. In addition, the welds have demonstrated adequate seam strength and uniformity.

In specific embodiments, the improved member is composed of aluminum. The tapered groove may be cut into the ridge at a depth of from about 0.5 mm to about 3.0 mm. The mouth of the tapered groove may have a width of from about 1.0 mm to about 3.0 mm.

In a specific embodiment, a horn according to the present embodiments is made from a standard AMAT horn blank. A tapered V-groove is cut into or formed in the end of the horn along the ridge. The horn is then lapped on the anvil, and subsequently, the desired reveal is created by lapping at the tail and/or to either side of the V-shaped groove or cut. The horn's rotation is designed to be 90 degrees from that of the standard AMAT horn, such that the seam material meets the horn at the mouth of the "V" and exits at its tail.

As explained above, due to the horn's unique shape, the overlapped material is pulled together during welding rather than being pushed apart as with the conventional horn. Both the shape of the cut and the particular rotation facilitates the pulling together of the seam material. As a result, thinner seam overlaps may be achieved, reducing the amount of material in the seam and producing a smoother seam that lends itself to imageability. In embodiments, the produced welded seam has a thickness of from about 85 μm to about 115 μm.

Figure 4A:
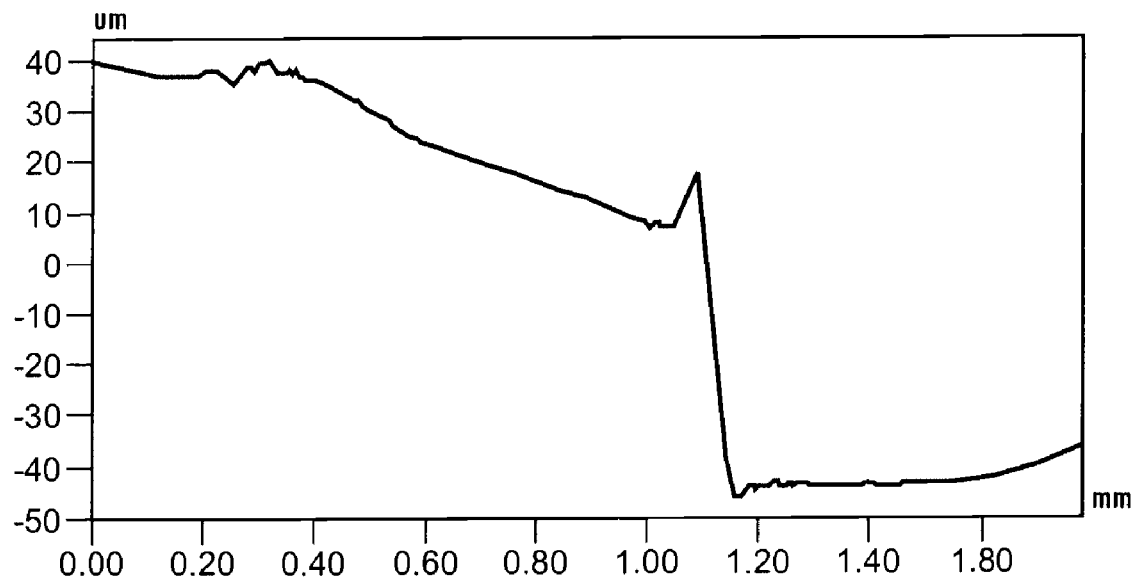
FIG. 4A is a graphical illustration of a seamed belt produced by a conventional horn.
Figure 4B:
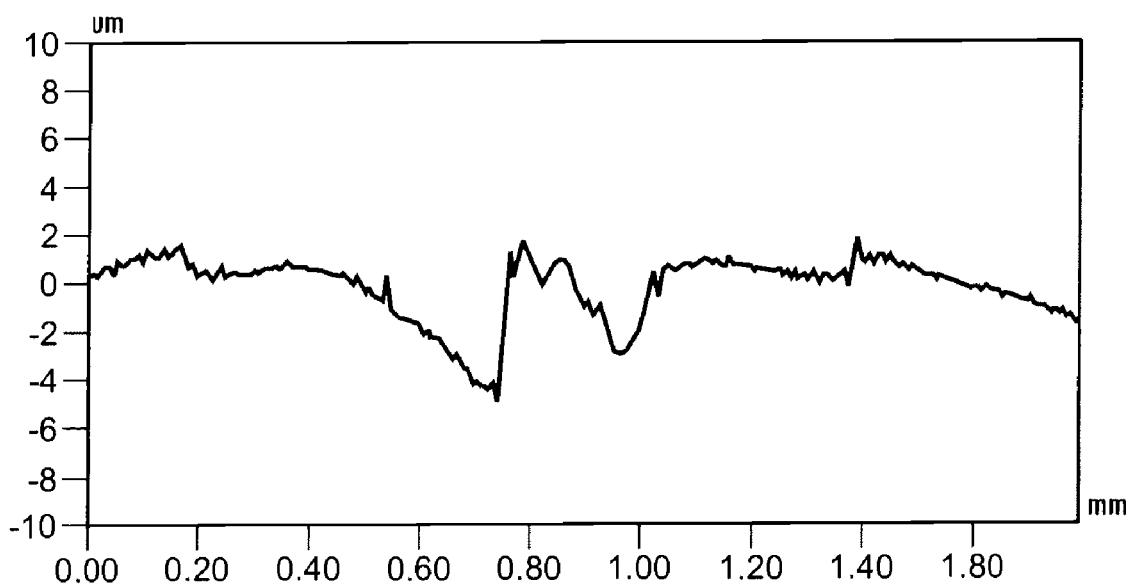
FIG. 4B is a graphical illustration of a seamed belt produced by the improved horn of FIG. 3 in accordance with the present embodiments.

FIG. 4A and FIG. 4B provide a graphical comparison of the ultrasonically welded seam achieved with a conventional horn (FIG. 4A) and an ultrasonically welded seam achieved with the improved horn (FIG. 4B). It can be seen that the improved horn substantially smoothes out the irregular surface topology and achieves substantially reduced seam thickness. In contrast, the seam produced by the conventional horn exhibits sharp protrusions at the seam. The bottom seam approximates an ultrasonic butt weld, with both overlapped edges in the same plane and no significant seam step height. The degree to which the seam is smoothed is also a function of pressure, temperature, traverse speed, and contact area.

In embodiments, there is also provided a method for using the improved member to achieve a smoother and thinner seamed flexible belt. In embodiments, the method comprises ultrasonically welding together overlapping sheets of electrophotographic imaging material with the improved member. More particularly, the method comprises providing sheets of electrophotographic imaging material to be joined at opposite edges of the sheets, overlapping the sheets at the opposite edges, positioning over the overlapping region the improved member for ultrasonically welding seamed flexible imaging member belts. As stated above, the improved member includes a ridge defined at an end of the member, and a tapered groove being defined in the ridge, wherein the tapered groove has a mouth and a tail. In particular embodiments, the improved member is an ultrasonic horn. The method further comprises rotating the improved member such that the electrophotographic imaging material contacts the end of the member at the mouth of the tapered groove and exits the tail of the tapered groove or from either side of the tapered groove, and contacting the overlapping region with the improved member to focus heat and pressure along the overlapping region while pulling the opposite edges together such that a flexible belt having a smooth welded seam is produced. Because no seam material is removed, the strength of the welded seam is maintained and not degraded.

The present embodiments also include ultrasonically welded seamed flexible belts formed by the processes described above. The resulting belts have improved seam surface topology and can withstand greater dynamic fatigue conditions. In addition, the present embodiments may be automated such that the processes can be run more efficiently and consistently to form the desired smooth seamed flexible belts.

The embodiments may be used to produce a flexible belt selected from the group consisting of a photoreceptor, an electroreceptor, and an intermediate image transfer belt. The flexible belt may consist of a single layer of substantially homogeneous material or may comprise at least two different layers having different compositions or properties. The present embodiments may be used on other welded seams, puzzle-cut seams and taped seams and are applicable across all machine platforms whether xerographic systems utilizing tandem or belt designs. The embodiments may also be applied to seams in various seamed belt members, such as for example, a photoreceptor, an electroreceptor, an intermediate image transfer belt, and the like.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning and range of equivalency of the claims are intended to be embraced therein.

All the patents and applications referred to herein are hereby specifically, and totally incorporated herein by reference in their entirety in the instant specification.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A method for making an ultrasonically welded seamed flexible imaging member belt comprising:
    providing sheets of electrophotographic imaging material to be joined at opposite edges of the sheets;
    overlapping the sheets at the opposite edges;
    positioning over the overlapping region an improved member for ultrasonically welding seamed flexible imaging member belts comprising
        a ridge defined at an end of the member, and
        a tapered groove being defined in the ridge, wherein the tapered groove has a mouth and a tail;
    rotating the improved member such that the electrophotographic imaging material contacts the end of the member at the mouth of the tapered groove and exits the tail of the tapered groove or from either side of the tapered groove; and
    contacting the overlapping region with the improved member to focus heat and pressure along the overlapping region while pulling the opposite edges together such that a flexible belt having a smooth welded seam is produced.

2. The method of claim 1, wherein the contacting step further serves to collect excess material and redeposit the excess material into seam gaps.

3. The method of claim 1 being adapted to produce a smooth welded seam without removing electrophotographic imaging material such that seam strength is maintained.

4. The method of claim 1, wherein the improved member is an ultrasonic horn.

5. The method of claim 1, wherein the imaging member is rotated 90 degrees from that of a standard ultrasonic horn.

6. The method of claim 1, wherein the improved member is composed of aluminum.

7. The method of claim 1, wherein the tapered Groove is cut into the ridge at a depth of from about 0.5 mm to about 3.0 mm.

8. The method of claim 1, wherein the tapered groove is V-shaped.

9. The method of claim 1, wherein the mouth of the tapered groove has a width of from about 1.0 mm to about 3.0 mm.

10. The method of claim 1, wherein the mouth is wider than the tail.

11. The method of claim 1, wherein the produced welded seam has a thickness of from about 85 μm to about 115 μm.

12. A method for making an ultrasonically welded seamed flexible imaging member belt comprising:
    providing sheets of electrophotographic imaging material to be joined at opposite edges of the sheets;
    overlapping the sheets at the opposite edges;
    positioning over the overlapping region an ultrasonic horn for ultrasonically welding seamed flexible imaging member belts comprising
        a ridge defined at an end of the member, and
        a tapered groove being defined in the ridge, wherein the tapered groove has a mouth and a tail;
    rotating the ultrasonic horn such that the electrophotographic imaging material contacts the end of the member at the mouth of the tapered groove and exits the tail of the tapered groove or from either side of the tapered groove; and
    contacting the overlapping region with the ultrasonic horn to focus heat and pressure along the overlapping region while pulling the opposite edges together such that a flexible belt having a smooth welded seam is produced.

* * * * *